US012755425B2

(12) United States Patent
Orzol et al.

(10) Patent No.: US 12,755,425 B2
(45) Date of Patent: Oct. 6, 2026

(54) METHOD AND APPARATUS FOR DETERMINING DEFORMATIONS ON AN OBJECT

(71) Applicant: FRAUNHOFER-GESELLSCHAFT ZUR FÖRDERUNG DER ANGEWANDTEN FORSCHUNG E. V., Munich (DE)

(72) Inventors: Jens Orzol, Mülheim an der Ruhr (DE); Michael Lenhartz, Mülheim an der Ruhr (DE); Daniel Baumann, St. Augustin (DE); Dirk Hecker, St. Augustin (DE); Ronja Möller, St. Augustin (DE); Wolfgang Vonolfen, St. Augustin (DE); Christian Bauckhage, St. Augustin (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 552 days.

(21) Appl. No.: 17/598,411

(22) PCT Filed: Mar. 30, 2020

(86) PCT No.: PCT/EP2020/058964
§ 371 (c)(1),
(2) Date: Sep. 27, 2021

(87) PCT Pub. No.: WO2020/201217
PCT Pub. Date: Oct. 8, 2020

(65) Prior Publication Data

US 2022/0178838 A1 Jun. 9, 2022

(30) Foreign Application Priority Data

Mar. 29, 2019 (EP) .................................... 19166259

(51) Int. Cl.
*G06T 7/73* (2017.01)
*G01N 21/88* (2006.01)
*G06T 7/00* (2017.01)

(52) U.S. Cl.
CPC .............. *G06T 7/75* (2017.01); *G06T 7/0004* (2013.01); *G01N 2021/8887* (2013.01)

(58) Field of Classification Search
None
See application file for complete search history.

(56) References Cited

U.S. PATENT DOCUMENTS 10,692,050 B2 * 6/2020 Taliwal .................. G06V 10/82
11,024,020 B2 * 6/2021 de Bonfim Gripp .. G06V 10/82
(Continued)

FOREIGN PATENT DOCUMENTS

CA 2346781 A1 4/2000
DE 198 46 530 A1 4/2000
(Continued)

OTHER PUBLICATIONS

Khodayar et al., "Optimzation of the Inspection of Large Composite Materials Using Robotized Line Scan Thermography," Journal of Nondestructive Evaluation, vol. 36, No. 32 (Year: 2017).*
(Continued)

*Primary Examiner* — Vincent Rudolph
(74) *Attorney, Agent, or Firm* — Leydig, Voit & Mayer, Ltd.

(57) ABSTRACT

Disclosed is a method for determining deformations on an object, wherein the object is illuminated and moved while being illuminated. In the process, the object is observed by at least one camera and at least two camera images are generated at different times by the camera. In the camera images, polygonal chains are ascertained in each case for reflections at the object caused by form features. The form
(Continued)

features are classified on the basis of the behavior of the polygonal chains over the at least two camera images and a two-dimensional representation is generated, the latter representing a spatial distribution of deformations. Also disclosed is a corresponding apparatus.

17 Claims, 3 Drawing Sheets

(56) References Cited

U.S. PATENT DOCUMENTS

| | | | | |
|---|---|---|---|---|
| 2007/0165939 | A1 * | 7/2007 | Savareigo ............ | G01N 21/956 382/145 |
| 2018/0017501 | A1 * | 1/2018 | Trenholm ............ | G01R 31/308 |
| 2019/0287237 | A1 | 9/2019 | De Bonfim Gripp et al. | |

FOREIGN PATENT DOCUMENTS

| | | | |
|---|---|---|---|
| DE | 101 04 355 | A1 | 9/2001 |
| JP | H09-280845 | A | 10/1997 |
| JP | H10-9839 | A | 1/1998 |
| WO | WO 2018/098551 | A1 | 6/2018 |

OTHER PUBLICATIONS

European Patent Office, Extended European Search Report in European Patent Application No. 19166259.2 (Jul. 29, 2019).

European Patent Office, International Search Report in International Application No. PCT/EP2020/058964 (Apr. 30, 2020).

European Patent Office, Written Opinion in International Application No. PCT/EP2020/058964 (Apr. 30, 2020).

International Bureau of WIPO, International Preliminary Report on Patentability in International Application No. PCT/EP2020/058964 (Sep. 28, 2021).

* cited by examiner

Figure 1
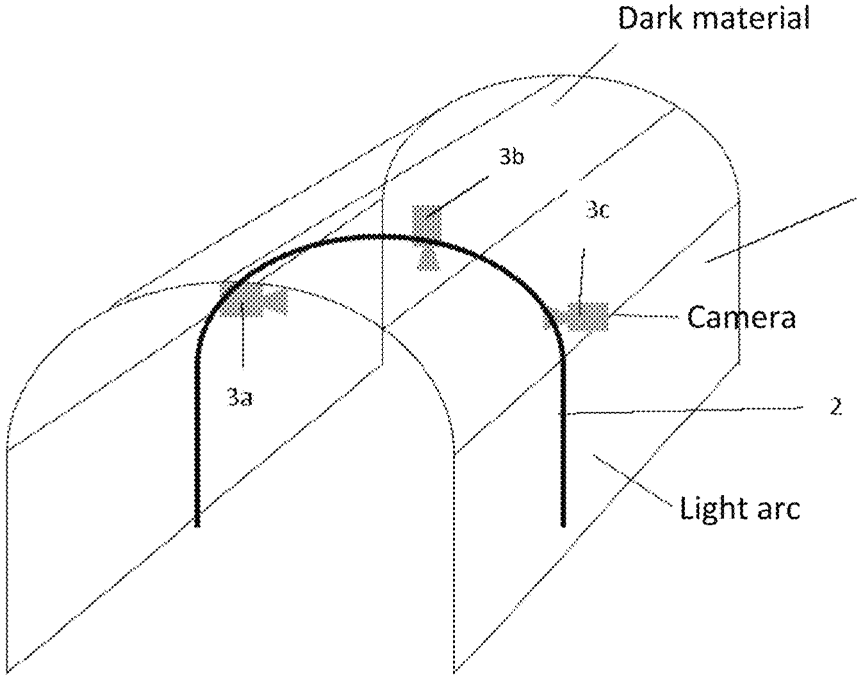
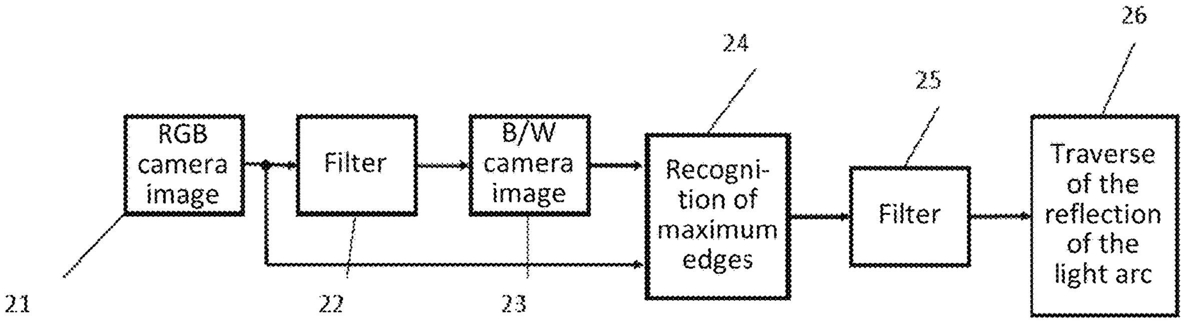
Figure 2

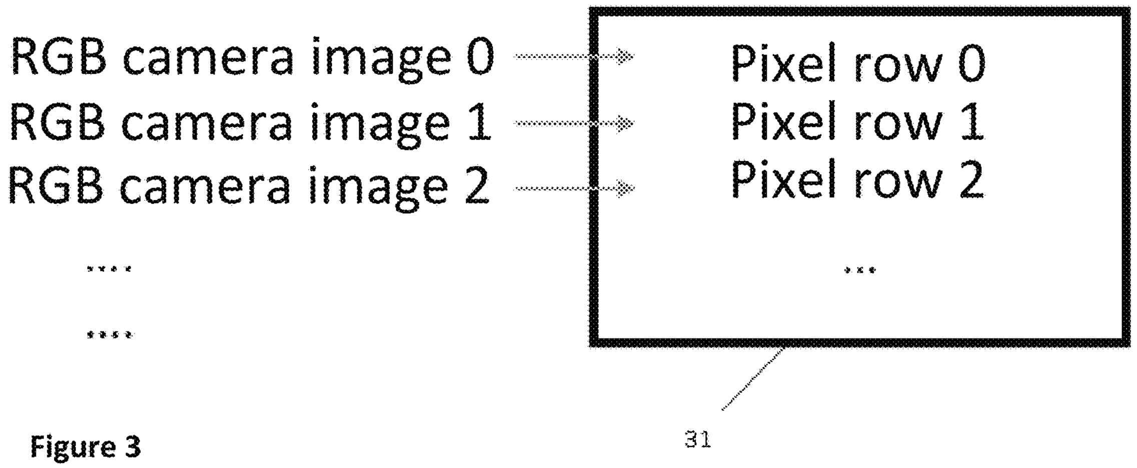
Figure 3
Figure 4
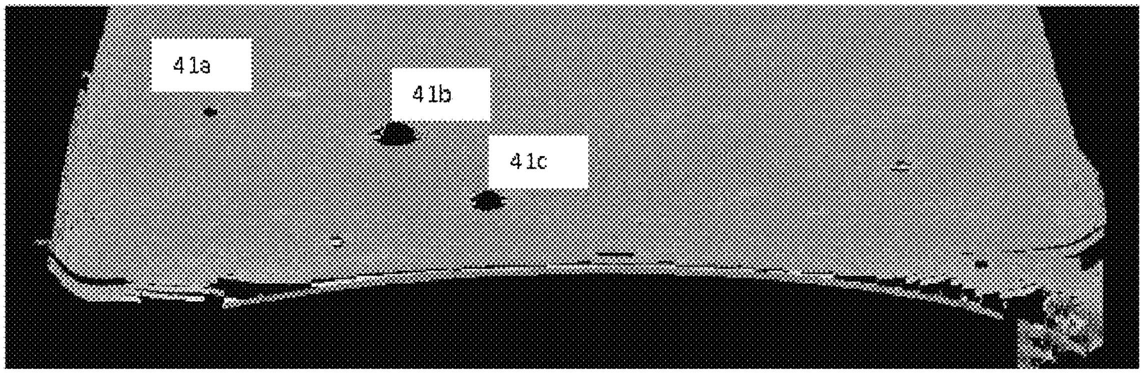

METHOD AND APPARATUS FOR DETERMINING DEFORMATIONS ON AN OBJECT

CROSS-REFERENCE TO RELATED APPLICATIONS

This patent application is the U.S. national phase of International Application No. PCT/EP2020/058964, filed on Mar. 30, 2020, which claims the benefit of European Patent Application No. 19166259.2, filed Mar. 29, 2019, the disclosures of which are incorporated herein by reference in their entireties for all purposes.

The invention relates to a method for determining deformations on an object, the object being illuminated and moved during the illumination. The object is thereby observed by means of at least one camera and at least two camera images are produced by the camera at different times. In the camera images, respectively polygonal chains are determined for reflections on the object, caused by shape features. On the basis of the behaviour of the polygonal chains over the at least two camera images, the shape features are classified and a two-dimensional representation which images a spatial distribution of deformations is produced. In addition, the invention relates to a corresponding device.

The approach presented here describes a low-cost process with minimal complexity in use for the automatic generation of a 2D representation in order to describe object surfaces and known deviations on unknown shapes or deviations from the expected shape. It is based on the behaviour of light reflections which is produced by an object to be measured moving below one or more cameras. In addition to the described hardware construction, the method used includes a specific combination of functions from the field of machine learning (ML) and artificial intelligence (AI). A typical application field is the recognition of component faults in a series production or the recognition of hail damage in vehicles.

Previous systems on the market or descriptions for approaches in this theme area are found above all in the field of damage recognition, for example for accident- or hail damage on vehicles, or as support for maintenance work within the framework of a preventive precaution, for example in the aircraft industry. Generally, they start from an as precise as possible measurement of an object surface or from a 3D reconstruction in order to be able to compare adequately deviations of the object shape. This means that the previous methods have one or more of the following disadvantages:

- High technical complexity for the measurement: expensive sensors, such as for example laser distance measuring devices, are used. In addition, the device requires a closed room.
- Long measuring or calculating times: evaluation of the measurement results or calculation of the 3D reconstruction require high calculation complexity of more than 10 minutes to over half an hour.
- High preparation time for the measurement: the object to be measured and also the measuring device must remain motionless for a period of time.
- Lack of mobility: the device used is not suitable for rapid assembly and dismantling or requires a fixed installation.

It is the object of the invention to indicate a method and a device for determining deformations on an object, with which at least some, preferably all, of the mentioned disadvantages can be overcome.

This object is achieved by the method for determining deformations on an object described herein, and also by the device for determining deformations on an object described herein. Advantageous configurations of the method and of the device according to the invention are also described.

According to the invention, a method for determining deformations on an object is indicated. At least one deformation on the object is thereby intended to be determined. There should be understood here by determining deformations, preferably recognition of deformations, classification of deformations and/or measurement of deformations.

According to the invention, in an illumination process, the object is irradiated by means of at least one illumination device with electromagnetic radiation of at least such a frequency that the object reflects the electromagnetic radiation as reflected radiation. The electromagnetic radiation can be for example light which can be present in the visible spectrum, in the non-visible spectrum, white or any other colour. The wavelength of the electromagnetic radiation is determined as a function of the material of the object such that the object reflects the electromagnetic radiation partially or completely.

During the illumination process, the object and the at least one illumination device are moved relative to each other according to the invention. What is relevant here firstly is merely the relative movement between the object and the illumination device, however it is advantageous if the illumination device is fixed and the object is moved relative thereto. During the movement, electromagnetic radiation emanating from the illumination device should always fall on the object and be reflected by the latter.

In an observation process, the object is observed by means of at least one camera and, by means of the at least one camera, at least two camera images are produced at different times and image the respectively reflected radiation. The cameras therefore record the electromagnetic radiation after the latter has been radiated by the illumination device and then reflected by the object. Preferably, the cameras are orientated such that no radiation from the illumination device enters the cameras directly. The observation process is implemented during the illumination process and during movement of the object. Any direction in which the object is moved is intended to be termed subsequently direction of movement.

During the observation process, the object is observed by means of at least one camera. The camera is therefore disposed preferably such that light, which was emitted by the illumination device and was reflected on the object, enters the camera.

By means of the observation, at least two camera images are produced by the camera at different times $t_i$, $i \in N$, $i=1, \ldots, n$, which image the respectively reflected radiation which passes into the camera. Preferably, $n \geq 5$, particularly preferably $\geq 100$, particularly preferably $\geq 500$, particularly preferably $\geq 1{,}000$.

According to the invention, at least one reflection of the radiation on the object, caused by a shape feature of the object, can now be determined or identified in the camera images. Any structure or any partial region of the object, which leads, by means of its shape and/or its texture, to the radiation emanating from the illumination device being reflected into the corresponding camera, can be regarded here as shape feature. In an optional embodiment, the arrangement of the object, of the camera and of the illumination device relative to each other can, for this purpose, be such that, at least in a partial region of the camera images, only reflections caused by deformations are present. In this case, all of the shape features can be deformations. Therefore, all reflections within this partial region in the camera image can thereby emanate from deformations. If for example the object is a motor vehicle, then such partial regions can be for example the engine bonnet, the roof and/or the upper side of the boot or respectively partial regions of these. The partial regions can advantageously be chosen such that only reflections of deformations pass into the camera.

However, reference may be made to the fact that this is not necessary. As is described also in the following, the reflections can also be classified in the method according to the invention. By means of such a classification, any reflections which can emanate from deformations to be determined can be detected, whilst other reflections can be classified as reflected by other shape features of the object. In the case of a motor vehicle, for example some of the reflections of shape features, such as beads or edges, can emanate from the bodywork and others of the shape features which do not correspond to the reference state of the motor vehicle, such as for example hail dents. Then the latter can be classified for example as deformations.

For example, reflections can be determined as shape features, i.e., such regions of the image recorded by the camera, in which light emanating from the illumination device and reflected by the object is imaged. If the object is not completely reflective, then those regions in the corresponding camera image, in which intensity of the light emitted by the light source and reflected on the object exceeds a prescribed threshold value, can be regarded as reflections. For example, any reflection is regarded as emanating from precisely one shape feature.

According to the invention, at least one deformation of the object is normally visible in the camera images. In particular, such a deformation also changes the reflections in the image recorded by the camera. It no longer corresponds there to the reflection of a normal object shape. Preferably those shape features which are not shape features of a reference state of the object, i.e., are not shape features of the normal object shape, can be regarded therefore as deformations.

Also in the case of a matt surface of the object, the reflection is maximum in the direction (angle of incidence=) angle of reflection and reduces rapidly for those other than the angle of reflection. A matt surface therefore normally produces a reflection with soft edges. The reflection of the light source as such is also clearly distinguishable from the reflection of the background. Its shape likewise does not change.

For matt surfaces, preferably the threshold parameters for a binarisation are set in the black/white image or, for an edge recognition a different one from in reflective surfaces.

In addition, the radiation source can also be focused advantageously, e.g., via a diaphragm.

According to the invention, in a step termed polygonal chain step, respectively a polygonal chain is determined now for at least one of the at least one reflections in the at least two camera images. The polygonal chain can thereby be determined such that it surrounds the corresponding reflection or the corresponding shape feature. For determining the polygonal chain, there are numerous different possibilities.

There should be understood here by a polygonal chain, a linear shape in the corresponding camera image in which a plurality of points are connected to each other respectively by straight lines. The polygonal chain is preferably determined such that it surrounds a reflection appearing in the corresponding camera image as closed. For example, the x-coordinates of the points can be produced from the horizontal extension of the observed reflection (or of the region of the reflection which exceeds a chosen brightness value) and the y-coordinates can be chosen for each x-coordinate such that they are positioned on the most highly pronounced upper- or lower edge (observation of the brightness gradient in the gap of the image belonging to x). Upper- and lower edge are simplified to form a y-coordinate for extreme points, such as the points at the outer ends.

In another example, the polygonal chain can be determined such that the intersection of the surface enclosed by the polygonal chain and of the visible reflection in the camera image (or of the region of the reflection which exceeds a specific brightness value) is maximum with simultaneous minimisation of the surface surrounded by the polygon.

In yet another example, it is also conceivable to determine the polygonal chain such that, in the case of a prescribed length of the straight lines or a prescribed number of points, the integral over the spacing between the polygonal chain and the image of the reflection in the camera image is minimal.

Preferably, each of the polygonal chains surrounds only one coherent reflection. There should be understood here by a coherent reflection, those reflections which appear in the corresponding camera image as coherent surface.

For example, a polygonal chain can be produced by means of the following steps: contrast equalisation, optionally conversion into a grey-scale image or selection of a colour channel, thresholding for binarisation, morphological operation (connection of individual coherent white pixel groups), plausibility tests for rejecting meaningless or irrelevant white pixels (=reflections), calculation of the surrounding polygonal chain of the remaining white pixel cluster. This example is only a possible embodiment. Numerous methods for determining polygonal chains relating to prescribed shapes are known.

Advantageously, the polygonal chains can also be determined by means of the following steps. For calculation of the polygonal chain of a reflection, firstly the contrast of the camera image can be standardised, then the image can be binarised (so that potential reflections are white and all others black). Subsequently, unrealistic reflection candidates can be rejected and ultimately, with the binary image as mask, the original camera image will be examined for vertical edges precisely where the binary image is white. The two most highly pronounced edges for each x-position in the camera image are combined to form a polygonal chain which surrounds the reflection (at extreme points, then is simplified to only one value for the strongest edge).

According to the invention, a two-dimensional representation is now produced from the at least two camera images. In said representation, the times $t_i$ at which the at least two camera images were produced are plotted in one dimension, subsequently termed t-dimension or t-direction. Each line of this representation in the t-direction therefore corresponds to one of the camera images. Different ones of the camera images correspond to different lines. In the other dimension of the two-dimensional representation, which is intended to be termed subsequently x-dimension or x-direction, a spatial coordinate which is perpendicular to the direction of movement is plotted. This x-dimension preferably corresponds to one of the dimensions of the camera images. In this case, the direction of movement and also the x-direction in the camera images extends parallel to one of the edges of the camera images.

Then at least one property of the polygonal chain at the location x in the camera image which was recorded at the corresponding time $t_i$ is plotted as value at the points $(x, t_i)$ of the two-dimensional representation. In an advantageous embodiment of the invention, at each point of the two-dimensional representation, a k-tuple with $k \geq 1$ can be plotted, in which each component corresponds to a property of the polygonal chain. Each component of the k-tuple therefore comprises, as entry, the value of the corresponding property of the polygonal chain at the time $t_i$ at the location x in the camera image recorded at the time $t_i$.

The two-dimensional representation now makes it possible to classify the shape features on the basis of the behaviour of the at least one polygonal chain over the at least two camera images. At least one of the shape features is thereby intended to be classified as to whether it is a deformation or not a deformation. Advantageously, at least one shape feature is classified in this way as deformation. For this purpose, as described further on in detail, for example the two-dimensional representations can be presented in a neuronal network which was trained with the two-dimensional representations recorded for known shape features.

In an advantageous embodiment of the invention, the at least one property of the polygonal chain which is entered in the two-dimensional representation, can be one or more of the following: an average incline of the polygonal chain on the x-coordinate or x-position in the x-dimension in the camera image $t_i$, a spacing between two sections of the polygonal chain on the corresponding x-coordinate or x-position in the x-dimension in the camera image $t_i$, i.e., a spacing in the direction of the $t_i$, and/or a position of the polygonal chain in the direction of the $t_i$, i.e., preferably in the direction of movement. The sum of the inclines of all the sections of the polygonal chain present at the given x-coordinate in the camera image $t_i$, divided by the number thereof, can thereby be regarded as average incline of the polygonal chain at a given x-coordinate or x-position. It may be noted that, in the case of a closed polygonal chain at each x-coordinate which is passed through by the polygonal chain, normally two sections are present with the exception of the extreme points in x-direction. Correspondingly, the spacing between the two sections of the polygonal chain which are present on the given x-coordinate can be regarded as the spacing between two sections of the polygonal chain. It can be assumed here advantageously that, at each x-coordinate, at most two sections of the same polygonal chain are present. For example the position of one section of the polygonal chain or else also the average position of two or more sections of the polygonal chain at a given x-position can be regarded as position of the polygonal chain in the direction of movement.

Advantageously, the method according to the invention is implemented against a background which essentially does not or not at all reflect or emit electromagnetic radiation of the frequency with which the object is irradiated in the illumination process. Advantageously, the background is thereby disposed such that the object reflects the background there in the direction of the at least one camera where it does not reflect the light of the at least one illumination device in the direction of the at least one camera. In this way, it is achieved that only that light which emanates either from the at least one illumination device or from the background falls into the camera from the object so that, in the camera image, the reflected illumination device can be distinguished unequivocally from the background.

In a preferred embodiment of the invention, within the scope of the method, also a measurement of the at least one deformation can be effected. It is advantageous for this purpose to scale the two-dimensional representation in the t-direction in which the $t_i$ are plotted, as a function of the spacing between the object and the camera. Scaling in the sense of an enlargement of the image of the deformation in the two-dimensional representation can be effected for example by lines which correspond to specific $t_i$ being multiplied whilst a scaling in the sense of a reduction can be effected for example by some lines which correspond to specific $t_i$ being removed from the two-dimensional representation. In the case where a plurality of cameras is used, such a scaling for the two-dimensional representations of all cameras can be effected, respectively as a function of the spacing of the object from the corresponding camera.

In a further preferred embodiment of the invention, the spacing of the object surface from the recording camera can be used for measurement. The distance can ensure scaling at various places, e.g., in the rough camera RGB image, in the 2D colour representation in Y-direction and/or X-direction, in the finished detected deviations (for example described as bounding boxes with 2D position coordinates).

The distance can be used in order to scale the original image, to scale the representation and/or to scale the final damage detections (example: damage which is further away appears smaller in the image, however the damage is in reality just as large as damage which is nearer the camera and appears larger). The scaling is effected preferably in x- and y-direction. In addition, the distance can be used to indicate the size of the detections (on the representation in pixels) in mm or cm. The correspondence of pixel to centimetre results from the known imaging properties of the camera which is used (focal width etc.).

Optionally, likewise at the end of the calculation, the image pixel to cm can be determined on the basis of the spacing information and hence the size of the shape features actually to be calculated can be obtained.

In a further preferred embodiment of the invention, the two-dimensional representation can be scaled, on the basis of a speed of the object in the direction of the direction of movement, in the t-dimension in order to enable a measurement of the shape features or deformations. For this purpose, the speed of the movement of the object during the illumination process or during the observation process can be determined by means of at least one speed sensor. Also the processing of the camera images can be used for speed determination by moving objects in the image being detected and tracked.

The two-dimensional representation can be scaled in the t-direction in which the ti are plotted, as a function of the object speed. Scaling in the sense of an enlargement of the image of the deformation in the two-dimensional representation can be effected for example by lines which correspond to specific $t_i$ being multiplied whilst a scaling in the sense of a reduction can be effected for example by some lines which correspond to specific $t_i$ being removed from the two-dimensional representation. In the case where a plurality of cameras is used, such a scaling for the two-dimensional representations of all cameras can be effected, respectively as a function of the speed of the object in the respective camera image.

For this purpose, the speed of the movement of the object during the illumination process or during the observation process can be determined by means of at least one speed sensor. Such a scaling is advantageous if dimensions of the deformations are intended to be determined since, when maintaining the times $t_i$, the object covers different stretches in the direction of movement between two $t_i$ at different speeds and therefore, in the two-dimensional representation, appears initially of a different size as a function of the speed. If the two-dimensional representation is scaled with the speed in the direction of the $t_i$, then this can be effected such that the spacing between two points in the direction of the $t_i$, independently of the speed of the object, corresponds to a specific spacing on the object. In this way, then shape features or deformations in the dimensioning thereof can be measured in the direction of the direction of movement.

Advantageously, the method can be controlled automatically, for example by means of measuring values of at least one control sensor. Such a one can be for example a light barrier, with the signal of which the method is started and/or ended if the object passes into the measuring region of the light barrier. Such a light barrier can be disposed for example at the inlet and/or at the outlet of a measuring region. The measuring region can be that region in which the object is observed by the at least one camera.

In an advantageous embodiment of the invention, the illumination device has at least or exactly one light strip or is one such. There is hereby understood by a light strip, an oblong light source, preferably extending in an arc which is extended in a direction, its longitudinal direction, significantly more than in its directions perpendicular hereto. Such a light strip can then preferably surround the region, at least partially, through which the object is moved during the illumination process. It is then preferred if the at least one camera is mounted on the light strip such that a viewing direction of the camera starts from a point on or directly adjacent to the light strip. Preferably, the viewing direction of the camera thereby extends in a plane spanned by the light strip or in a plane parallel to the latter. In this way, it can be ensured that, extensively independently of the shape of the object, light is always also reflected into the camera. As a function of the shape of the object, this can start from different points along the light strip.

In an advantageous embodiment, the method according to the invention can have a further determination step in which a position and/or a size of the deformation or of the shape feature is determined. In this case, it is advantageous in particular if the two-dimensional representation is scaled at the speed of the object and/or at the spacing of the object from the camera. For determining the position and/or the size of the deformation, advantageously at least one shape and/or size of the at least one polygon and/or of an image of at least one marker fitted on the object can be used. When using markers, these can be fitted on the surface of the object or in the vicinity.

For determining the position and/or the size of the deformation, advantageously at least one shape and/or size of the at least one polygon and/or a marker fitted on the object and visible in the camera image, the real dimensions of which marker are known and which advantageously also includes a line recognisable in the camera image, can be detected and used in the camera image. The marker can be recognised for example by means of image processing. Advantageously, its size can be known and compared with adjacent deformations.

The polygonal chain can have a specific horizontal width via which the object can be estimated in its total size.

The marker appears preferably only in the camera image and serves preferably for scaling and is preferably not transferred into the 2D representation. For example, a marker can be used on an engine bonnet, a roof and a boot in order to recognise roughly segments of a car.

The position and size of a shape feature or of a deformation can also be detected by means of a neuronal network. For this purpose, the two-dimensional representation can be entered into the neuronal network. This determination of position and/or size can also be effected by the neuronal network which classifies the shape features.

In an advantageous embodiment of the invention, the two-dimensional representation or regions of the two-dimensional representation can be assigned, in an assignment process, to individual parts of the object. For this purpose, for example the object can be segmented in the camera images. This can be effected for example by the camera images being compared with shape information about the object. The segmentation can be effected also by means of sensor measurement and/or by means of markers fitted on the object.

In the case of a motor vehicle, the segmentation can be effected for example as follows: 3D-CAD data describe cars with engine bonnet, roof, boot, the markers identify these three parts. In addition, window regions can be recognised by the smooth reflection and the curvature thereof. The segmentation can also be effected with NN, purely image-based. Or the 3D-CAD data can be made advantageously into a 2D image if the viewing direction of the camera is known and this can then be compared with the camera image.

A further example of an assignment of regions of the two-dimensional representation to individual parts of the object can be effected by the behaviour of the reflection being observed (curvature, thickness, etc., therefore implicitly shape information) or with the help of machine learning algorithms, e.g., NNs., or it being prescribed to fit the markers on specific components of the object.

The method according to the invention can be applied particularly advantageously on motor vehicles. It can be applied particularly advantageously, in addition, if the deformations are dents in a surface of the object. The method can therefore be used for example in order to determine, detect and/or measure dents in the bodywork of motor vehicles.

According to the invention, the shape features are classified on the basis of the behaviour of the at least one polygonal chain which is assigned to the corresponding shape feature over the at least two camera images. This classification can be effected particularly advantageously by means of at least one neuronal network. Particularly advantageously, the two-dimensional representation can be prescribed for this purpose to the neuronal network and the neuronal network can classify the shape features imaged in the two-dimensional representation. An advantageous classification can reside for example in classifying a given shape feature as being a dent or not being a dent.

Advantageously, the neuronal network can be trained or have been trained by there being prescribed to it a large number of shape features with known or prescribed classifications and the neuronal network being trained such that a two-dimensional representation of the shape features is classified with a prescribed classification in the prescribed manner. Therefore for example two-dimensional representations can be prescribed, which were produced by an object with shape features to be classified correspondingly, for example a motor vehicle with dents, being described as above for the method according to the invention, being illuminated and being observed by means of at least one camera, and from the thus recorded camera images, as described above for the method according to the invention, a polygonal chain being determined for the shape features in the camera images respectively. Then, from the at least two camera images, a two-dimensional representation can be produced in which the times $t'_i$ are plotted in one dimension, at which times the camera images were produced and, in the other of the two dimensions, the spatial coordinate is plotted perpendicular to the direction of movement. What was said above applies here correspondingly. As value, again the at least one property of the polygonal chain is then entered at the points of the two-dimensional representation. Preferably the same properties which were measured during the actual measurement of the object are thereby used. In this way, therefore two-dimensional representations which reflect the shape features which the object had, are produced.

The training can also be effected with two-dimensional representations produced from images of the object. Here, deformations can be prescribed in the images, which deformations are formed such that they correspond to images of actual deformations in the camera images. The thus produced two-dimensional representation can then be prescribed together with the classifications to the neuronal network so that the latter learns the classifications for the prescribed deformations. If the deformations are supposed to be dents, for example in the surface of a motor vehicle, then these can be produced in the images for example by means of the WARP function.

Since in the teaching step the classification of these shape features, i.e., for example as dent or non-dent, is known, the neuronal network with the two-dimensional representations, on the one hand, and the prescribed known classifications, on the other hand, can be learned.

According to the invention, in addition a device for determining deformations on an object is indicated. Such a one has at least one illumination device with which a measuring region, through which the object can be moved, can be illuminated with electromagnetic radiation of at least such a frequency that the object reflects the electromagnetic radiation as reflected radiation. What was said about the method applies correspondingly for the illumination device. The illumination can be mounted advantageously behind a diaphragm in order to focus it for the reflection appearing in the camera image.

Furthermore, the device according to the invention has at least one camera with which the object can be observed, whilst said object is moved through the measuring region. What was said about the method applies correspondingly for the camera and the orientation thereof relative to the illumination device.

With the at least one camera, at least two camera images at different times $t_i$, $i \in N$, $i=1, \ldots, n$ which image the respectively reflected radiation, can be produced by observation.

According to the invention, the device has in addition an evaluation unit with which at least one shape feature of the object can be recognised in the camera images, respectively one polygonal chain being able to be determined for at least one of the at least one shape features in the at least two camera images. The evaluation unit can be equipped to produce a two-dimensional representation from the at least two camera images, in which representation the times $t_i$ are plotted in one dimension at which times the at least two camera images were produced and, in the other dimension, the spatial coordinate perpendicular to the direction of movement is plotted, particularly preferably perpendicular to the direction of movement, as it appears in the image recorded by the camera. Particularly preferably, this x-direction is situated parallel to one of the edges of the camera image.

As value, the evaluation unit can in turn, at the points of the two-dimensional representation, firstly enter a property of the polygonal chain in the camera image at the time $t_i$ at location x. Here also what was said about the method applies analogously.

The evaluation unit can then be equipped to classify the shape features on the basis of the behaviour of the at least one polygonal chain over the at least two camera images. Advantageously, the evaluation unit can have a neuronal network for this purpose, which was learned as described above particularly preferably.

It is preferred if the device according to the invention is equipped to implement a method configured as described above. The method steps could hereby, insofar as they are not implemented by the camera or the illumination device, be implemented by a suitably equipped evaluation unit. This can be for example a calculator, a computer, a corresponding microcontroller or an intelligent camera.

BRIEF DESCRIPTION OF THE DRAWINGS

The invention is intended to be explained subsequently by way of example with reference to some Figures.

There are shown:

FIG. 1 an embodiment of the device according to the invention, by way of example, FIG. 2 a process diagram, by way of example, for determining a polygonal chain in the method according to the invention, and FIG. 3 a procedure, by way of example, for producing a two-dimensional representation, FIG. 4 by way of example, a two-dimensional representation which is producible in the method according to the invention, FIG. 5 a camera image, by way of example, and FIG. 6 an end result of a method according to the invention, by way of example.

DETAILED DESCRIPTION OF THE INVENTION

Figure 5:
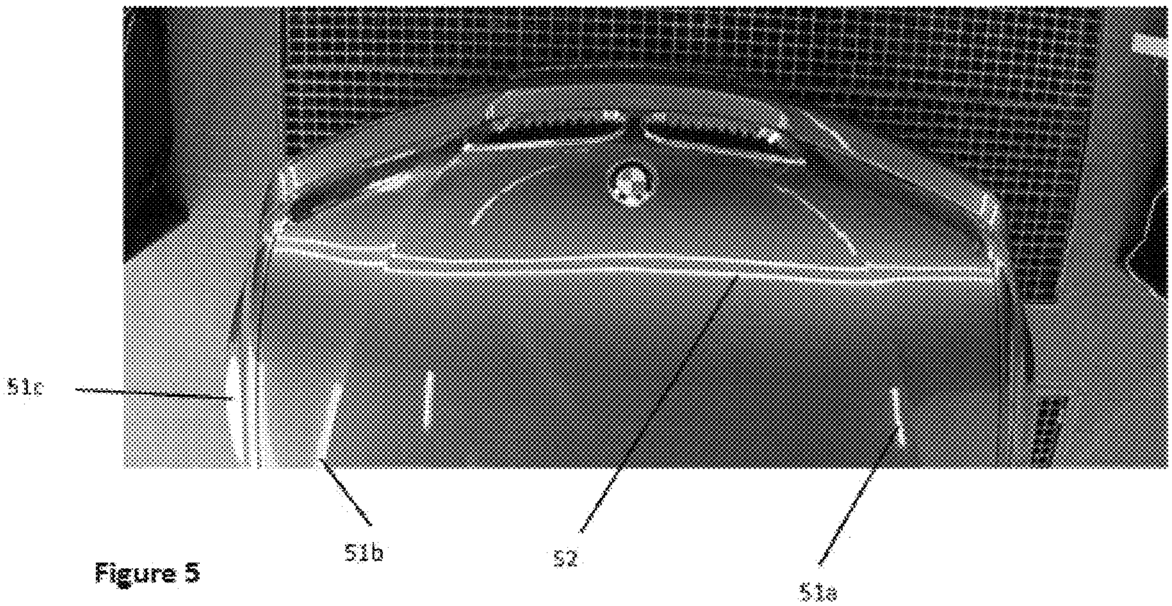

FIG. 1 shows an example of a device according to the invention in which a method according to the invention for determining deformations on an object can be implemented. In the example shown in FIG. 1, the device has a background 1 which here is configured as tunnel with two walls parallel to each other and a round roof, for example a roof of a circular-cylindrical section. The background 1, in the shown example, has a colour on its inner surface which differs significantly from a colour with which an illumination device 2, here a light arc 2, illuminates an object in the interior of the tunnel. For example, if the illumination device 2 produces visible light, then advantageously the background can, on its inner surface which is orientated towards the object, have a dark or black background. The object is not illustrated in FIG. 1.

The light arc 2 extends, in the shown example, in a plane which is perpendicular to a direction of movement with which the object moves through the tunnel 1. The light arc extends here essentially over the entire extension of the background 1 in this plane, which is not however necessary. It is also adequate if the light arc 2 extends only on a partial section of the extension of the background in this plane.

Alternatively, also the illumination device 2 can also have one or more individual light sources.

In the example shown in FIG. 1, three cameras 3*a*, 3*b* and 3*c* are disposed on the light arc, which cameras observe a measuring region in which the object, when it is moved in the direction of movement through the tunnel 1, is illuminated by the at least one illumination device. The cameras then detect respectively the light emanating from the illumination device 2 and reflected by the object and produce, at at least two times respectively, camera images of the reflections. In the shown example, the viewing directions of the cameras 3*a*, 3*b*, 3*c* extend in the plane in which the light point 2 extends or in a plane parallel thereto. The central camera 3*b* looks perpendicularly downwards and the lateral cameras 3*a* and 3*c* look in the direction perpendicular to the viewing direction of the camera 3*b* at the same height towards to each other. Reference may be made to the fact that also fewer cameras or more cameras can be used, the viewing directions thereof can also be orientated differently.

The cameras 3*a*, 3*b* and 3*c* produce respectively camera images 21 in which, as shown by way of example in FIG. 2, polygonal chains can be determined. FIG. 2 shows, as can be determined in one of the camera images 21, a polygonal chain of the reflection of the light arc 2 on the surface of the object. The reflections are thereby produced by shape features of the object. The camera image 21 is hereby processed by a filter 22 which produces for example a grey-scale image 23 from the coloured camera image 21. Such a one can be for example a false colour binary image. From the resulting grey scales, by comparison with a threshold value, a binary image can hereby be produced by for example all the pixels with grey scales above the threshold value assuming the one value and all the pixels with grey scales below the threshold value the other value. In a further filtering, in addition all pixels which were not produced by a reflection can be set to zero. Thus for example a black-white camera image 23 can be produced from the filter.

On the black-white camera image 23 thus produced, together with the original camera image 21, an edge recognition 24 can be implemented. The edge image determined thus can be entered then in a further filter 25 which produces a polygonal chain 26 of the reflection of the light arc 2.

The maximum edge recognition runs for example through the RGB camera image on the basis of the white pixels in the black/white image and detects, for each X-position, the two most highly pronounced edges (upper and lower edge of the reflection). Filter 25 combines these edges to form a polygonal chain. Further plausibility tests can exclude false reflections so that, at the end, only the polygonal chain of the reflection of the illumination source remains.

FIG. 3 shows, by way of example, how a two-dimensional representation 31 is produced from the camera images 21 produced at different times ti. In the two-dimensional representation 31, each line corresponds to a camera image at a time ti, i=1, . . . n. Each line of the two-dimensional representation 31 is able therefore to correspond to the i. In the horizontal direction, an x-coordinate can be plotted in the two-dimensional representation 31, which preferably corresponds to a coordinate of the camera images 21, which particularly preferably is perpendicular to the direction of movement in the camera image 21. In the illustrated example, for example an average gradient or an average incline of the polygonal chain 26, for each point in the two-dimensional representation 31, can now be entered in the camera image at the time ti at the point x and/or for example a vertical thickness of the polygonal chain can be entered, i.e., a thickness in the direction perpendicular to the x-direction in the camera image. As further value, also a y-position of the polygonal chain, i.e., a position in the direction perpendicular to the x-direction in the camera image could be entered, for example coded in the third property. A coding of the y-position of the polygonal chain as vertical y-shift in the 2D representation in combination with the y-positions of the camera images $t_i$ is likewise possible, however not plotted in FIG. 3. Advantageously, the two-dimensional representation 31 can be stored as colour image in which the colour components red, blue or green bear the values of different properties of the polygonal chain. For example, in the green component, the gradient or the mentioned average incline of the polygonal chain could be stored and, in the blue component, the vertical thickness of the polygonal chain.

FIG. 4 shows, by way of example, a two-dimensional reconstruction produced in this way. FIG. 4 comprises recognisable curved lines which are produced from the y-deformation of the reflections in the camera image. Numerous shape features, three of which are particularly pronounced as deformations 41*a*, 41*b* and 41*c* can be recognised. These appear in the two-dimensional representation with a different colour value from those regions in which no deformation is present.

Such two-dimensional representations can be used in order to train a neuronal network. In a concrete example, the behaviour of the reflections is converted automatically into this 2D representation. There, the deformations are determined and noted (for example manually). Then finally only the 2D representation with its marks is required to be learned. On the 2D representation, direct markers are painted (e.g., copy/paste). These can be recognised easily automatically (since they are preferably always of the same shape) and for example can be converted into an XML representation of the dent positions on the 2D representation. That is only then the basis for the training of the neuronal network (NN). In the later application of the NN, there is then only the 2D representation and no longer any markers.

FIG. 5 shows, by way of example, a camera image which was recorded, here of a bonnet of a car. Numerous reflections, some of which are marked as 51*a*, 51*b*, 51*c* and 52, can be recognised. The reflections are produced by shape features of the bonnet, such as for example bends and surfaces, reflecting the illumination source. On the planar parts of the bonnet, a strip-shaped illumination unit is reflected and produces, in the camera image, the reflections 52, which illumination unit appears here in the flat region as two strips, however has steps at the bends.

The reflections can then be surrounded by polygons which can be further processed as described above.

Figure 6:
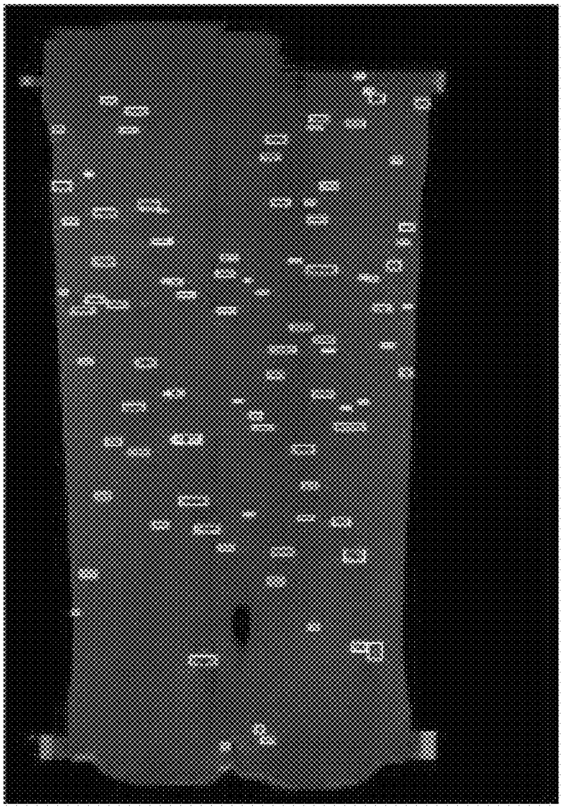

FIG. 6 shows, by way of example, an end result of a method according to the invention, given by way of example. Here, a two-dimensional representation forms the background of the image on which recognised deformations are marked by rectangles. Hail dents are prescribed here as deformations to be recognised. By applying the neuronal network, all of the hail dents were determined as deformations and provided with a rectangle.

The invention present here is aimed advantageously at the mobile low-cost market which requires as rapid as possible assembly and dismantling and also as rapid as possible measurements and hence eliminates all of the above-mentioned disadvantages. For example, the assessment of hail damage on vehicles can be effected preferably according to the weather event at variable locations and with a high throughput. Some existing approaches use, comparably with the present invention, the recording of reflections of light patterns in which the object can also be moved partially (an expert or even the owner himself drives the car through under the device).

The special feature of the invention presented here, in contrast to existing approaches, resides in calculating a 2D reconstruction or 2D representation as description of the behaviour of the reflection over time, in which shape deviations can be recognised particularly well. This behaviour arises only by moving the object to be examined or the device. Since here only the behaviour of the reflection over time is relevant, it is possible, in contrast to existing systems, to restrict it, for example, to a single light arc as source of the reflection.

The reconstruction or representation is a visualisation of this behaviour, which can be interpreted by humans, and need not be able to be assigned necessarily proportionally to the examined object shape. Thus, for example not the depth of a deviation but probably preferably its size is determined. It proves to be sufficient for an assessment.

In the following, a course of the method, given by way of example, is intended to be summarised again briefly. This course is advantageous but can also be produced differently.

1. One or more light sources of a prescribed shape (e.g., strip-like) are provided and span a space provided for the measurement. The light sources can have for example the shape of a light strip and surround the provided space in the form of an arc. The light can be in the non-visible spectrum, white or radiate in any other colour.
2. A material which is contrast-rich relative to light is prescribed in the background of the light sources. The material can be, for example in the case of white light, a dark material which spans the provided space before use.
3. Objects to be measured pass through this space. For this purpose, the object can move through the provided space or a device can travel along the provided space over the stationary object.
4. One or more sensors are advantageously provided inside the spanned space for measurement of the distance relative to the object surface.
5. One or more sensors for controlling the measurement can be provided. This can be for example a light barrier, with which the measurement is started and stopped again as soon as the object passes through or leaves the spanned space.
6. One or more cameras are present which are directed towards the object to be examined inside the spanned space and detect the reflections of the light sources. The cameras can be high-resolution (e.g., 4K or more) or also operate with higher frame rates (e.g., 100 Hz or more).
7. An algorithm or sensor which determines the direction and speed of the object in the spanned space can be used.
8. An algorithm for quality measurement of the calculated 2D representation based on
   i. image processing
   ii. markers fitted on the object surface
   iii. sensor values can be used.

Such sensors can measure for example the speed at which the object passes by the cameras and hence give an indication of the minimally visible movement step between two images of the camera or the movement blur in the images.
9. An algorithm can be used which calculates the surrounding polygonal chain of each light reflection in the camera image.

The algorithm can comprise inter alia methods for binarisation, edge recognition (e.g., canny edge), and also noise filters or heuristic filters.
10. An algorithm can be used which calculates a 2D representation of the object surface from the behaviour of the polygonal chains.

This representation visualises the behaviour of the polygonal chains in object surfaces which correspond to the expected shape, and also the deviations thereof in a different illustration. One embodiment can be for example a false colour- or grey-scale illustration. The representation need not be proportional to the object surfaces or with the same detail precision. Information about a shape to be expected is not required. If this information is present, then it can be used.
11. An algorithm can be used which determines, on the basis of the 2D representation, application-specific deviations of the object surface shapes. The deviations arise e.g., from
    a. application-specific assumptions about shape and behaviour of the reflections. Smooth surfaces produce for example smooth, low-noise- and low-distortion reflections. In this case, expected shapes would be available.
    b. Comparison of shape and behaviour of the reflection on the basis of a reference measurement of an identically shaped object series or of the same object prior to use. For this purpose, the reference measurement can be stored for example in conjunction with an object series number or type number (in vehicles a number plate) in a data bank. Here also, expected shaped could be used.
    c. Application of a trained neuronal network which recognises precisely this type of deviations of the object surface shapes on the 2D representation. For this purpose, no expected shape of deviation is present.

In order to recognise the deviation with a trained algorithm (neuronal network) and to classify it, it is advantageous if it is known how it looks. It is therefore advantageous to know an expected shape of the deviation. The precise shape of the object is however not necessary (e.g., dents on the roof and bonnet of a motor vehicle can be recognised without the information roof/bonnet being present).
12. An algorithm can be used optionally to determine position and size of the deviations, based on a measurement of
    a. the shape or size of the light reflection
    b. a marker known in shape and size and fitted on the object surface. The marker can have for example the form of a circle, rectangle, cross etc. and be present in a known colour.
    c. sensor values (e.g., distance sensors)
13. An algorithm can be used to assign the 2D representation to various individual parts of the object on the basis of
    i. segmentation of the object image in the camera image (e.g., by trained neuronal networks)
    ii. comparing with present 2D or 3D shape information about the object (e.g., CAD data, 3D scans)
    iii. sensor measurement
    iv. markers fitted on the object surface.

If the speed of the object is measured, the 2D colour illustration can be standardised in the vertical size by a pixel row being written into the image multiplied according to the speed.

In addition to gradient and vertical thickness of the polygonal chain, advantageously also its y-position at any place x in the camera image can be coded in the 2D colour illustration. This means the y-position of the coding of a polygonal chain in the 2D colour illustration can be dependent upon e.g.:

the frame number of the camera video the speed of the object (=number of vertical pixels used per camera image)

and in addition y-position of the polygonal chain in the camera image respectively at the position x.

This variant is not illustrated in FIG. 3, however in FIG. 4. It reinforces the appearance of object shape deviations in the 2D colour illustration.

In order to support the production of training sets (=annotated videos) for the neuronal network, virtual 3D objects (for the hail damage recognition 3D car models) can be rendered graphically or finished images of the object surface (for the hail damage recognition car images) can be used, on which for example artificial hail damage is produced with mathematical 2D functions (for the hail damage recognition WARP functions).

In the following, it is intended to be explained, by way of example, how the two-dimensional representation or parts of the two-dimensional representation can be assigned respectively to individual parts of the object.

1. A trained neuronal network obtains the camera image as input, detects possible components of the object and marks their size and position (possible annotation types are bounding boxes and black-white masks for each component).
2. The behaviour of the reflection is examined—if it is known that specific components of the object cause a certain reflection behaviour (straight surfaces cause a straight reflection, highly curved surfaces cause a curved reflection), a classification of the components can be undertaken on the basis of the behaviour of the reflection.
3. If CAD data or general spacing information relating to the construction are known, it can be predicted, on the basis of the distance information, whether no object/a certain component of the object is situated directly opposite the camera.
4. Known markers which can be detected simply in the camera image can be applied, at the beginning/end/at the corners of the component. On the basis of the known position of the markers, conclusions can then be drawn about the position of the component of the object.

The invention claimed is:

1. A method for determining a deformation or deformations on an object, comprising:

wherein in an illumination process, irradiating the object by at least one illumination device with electromagnetic radiation of at least such a frequency that the object reflects the electromagnetic radiation as reflected radiation, moving the object and the at least one illumination device relative to each other in a direction of movement during the illumination process, observing the object by at least one camera and producing at least two camera images by the at least one camera by observing at different times $t_i$, i=1, . . . , n, which image the respectively reflected radiation, in the camera images, at least one reflection of the radiation on the object caused by a shape feature of the object being determined, determining in a polygonal chain for at least one of the at least one reflection in the at least two camera images, calculating a property of the at least one polygonal chain, producing a two-dimensional representation from the at least two camera images, in which, in one dimension of the two dimensions, the times $t_i$ are plotted, at which the at least two camera images are produced and, in the other of the two dimensions, termed x-dimension, a spatial coordinate perpendicular to the direction of movement being plotted, and the at least one property of the at least one polygonal chain in the camera image being plotted as value at the points of the two-dimensional representation at the time $t_i$ at the location x, and classifying at least one of the shape features as deformation or non-deformation on the basis of a behavior over time of the at least one polygonal chain over the at least two camera images;

wherein the deformation constitutes a dent on the object.

2. The method according to claim 1, wherein an image is produced which images a spatial distribution of those deformations which are classified as deformation.

3. The method according to claim 1, wherein the at least one property of the polygonal chain is an average incline of the polygonal chain at the spatial coordinate in the x-dimension, and/or a spacing between two sections of the polygonal chain at the spatial coordinate in the x-dimension and/or a position of the polygonal chain in the direction of movement.

4. The method according to claim 3, a background being present which essentially does not reflect or emit electromagnetic radiation of the frequency with which the object is irradiated in the illumination process, and being disposed such that the object reflects the background in the direction of the at least one camera where it does not reflect the light of the at least one illumination device in the direction of the at least one camera.

5. The method according to claim 1, determining a distance between the at least one camera and the object by at least one distance sensor disposed at a prescribed location, and scaling the two-dimensional representation on the basis of the distance in the direction of the $t_i$ and/or the method being controlled by measuring values of at least one control sensor, and/or determining the speed of movement of the object during the illumination process by at least one speed sensor and/or by image processing in the camera images, and scaling the two-dimensional representation on the basis of the speed in the direction of the $t_i$.

6. The method according to claim 1, wherein the illumination device being at least one light strip which surrounds a region at least partially, through which the object is moved during the illumination process.

7. The method according to claim 1, which includes a further determining step in which, from the two-dimensional representation, a position and/or size of the deformation is determined.

8. The method according to claim 1, further including an assignment process in which the two-dimensional representation is assigned to individual parts of the object.

9. The method according to claim 1, wherein the object is a motor vehicle.

10. The method according to claim 1, wherein the shape features are classified on the basis of the behavior over time of the at least one polygonal chain over the at least two camera images by at least one neuronal network.

11. The method according to claim 10, wherein the neuronal network is irradiated by at least one illumination device with electromagnetic radiation of at least such a frequency that the object reflects the electromagnetic radiation as reflected radiation, the object is moved during the illumination relative to the at least one illumination device in the direction of movement, the object is observed by the at least one camera and producing at least two camera images by the at least one camera by the observation at different times $t'_i$, i=1, . . . , m, which image the respectively reflected radiation, determining reflections of the radiation on the object in the camera images caused by shape features of the object, determining respectively one polygonal chain for at least one of the reflections in the at least two camera images, producing a two-dimensional representation from the at least two camera images, in which, in one dimension of the two dimensions, the times t'i are plotted, at which the at least two camera images are produced and, in the other of the two dimensions, termed x-dimension, a spatial coordinate perpendicular to the direction of movement is plotted and the at least one property of the polygonal chain in the camera image is entered as value at the points of the two-dimensional representation at the time $t_i$ at the location x, and at least some of the form features being prescribed as deformations of the object and the behavior over time of the polygonal chains corresponding to these deformations as characteristic for the deformations.

12. The method according to claim 1, wherein the classifying at least one of the shape features as deformation or non-deformation is effected by at least one trained neuronal network by utilizing the two-dimensional representation as an input of the at least one neuronal network.

13. A device for determining a deformation or deformations on an object comprising:

at least one illumination device with which a measuring region, through which the object can be moved, can be illuminated with electromagnetic radiation of at least such a frequency that the object reflects the electromagnetic radiation as reflected radiation, at least one camera with which the object can be observed, whilst it is moved through the measuring region, and with which, by the observation, at least two camera images can be produced at different times $t_i$, i=1, . . . , n, which image the respectively reflected radiation, having furthermore an evaluation unit with which at least one reflection on the object, caused by a shape feature of the object, can be detected in the camera images, for at least one of the at least one reflection in the at least two camera images respectively a polygonal chain being able to be determined, a property of the at least one polygonal chain being able to be calculated, from the at least two camera images, a two-dimensional representation being able to be produced, in which, in one dimension of the two dimensions, the times $t_i$ are plotted, at which the at least two camera images are produced and, in the other of the two dimensions, termed x-dimension, a spatial coordinate perpendicular to the direction of movement being plotted, and the at least one property of the at least one polygonal chain in the camera image being entered as value at the points of the two-dimensional representation at the time $t_i$ at the location x, and the at least one of the shape features being able to be classified as deformation on the basis of a behavior over time of the at least one polygonal chain over the at least two camera images;

wherein the deformation constitutes a dent on the object.

14. The device according to claim 13, wherein the illumination device is at least one light strip which surrounds the measuring region at least partially.

15. The device according to claim 14, which has a background which is configured such that it does not reflect or emit electromagnetic radiation of the frequency with which the object can be illuminated by the at least one illumination device, the background being disposed such that the object reflects the background in the direction of the at least one camera, where it does not reflect the at least one light source in the direction of the at least one camera.

16. The device according to claim 13, which has a background which is configured such that it does not reflect or emit electromagnetic radiation of the frequency with which the object can be illuminated by the at least one illumination device, the background being disposed such that the object reflects the background in the direction of the at least one camera, where it does not reflect the at least one light source in the direction of the at least one camera.

17. The device according to claim 13, wherein the at least one of the shape features is able to be classified as deformation or non-deformation by at least one trained neuronal network by utilizing the two-dimensional representation as an input of the at least one neuronal network.

* * * * *